United States Patent [19]
Merritt et al.

[11] Patent Number: 5,284,637
[45] Date of Patent: Feb. 8, 1994

[54] DRY SORBENT REACTIVATION PROCESS

[75] Inventors: Randy L. Merritt, Birmingham; Larry G. Felix, Pelham; John P. Gooch, Birmingham, all of Ala.

[73] Assignee: Southern Research Institute, Birmingham, Ala.

[21] Appl. No.: 765,958

[22] Filed: Sep. 26, 1991

[51] Int. Cl.$^5$ .......................... B01J 8/00; C01B 17/00
[52] U.S. Cl. ......................... 423/244.07; 423/244.08
[58] Field of Search .......... 423/242 A, 244 R, 244.07, 423/244.08

[56] References Cited

U.S. PATENT DOCUMENTS

| | | |
|---|---|---|
| 4,388,283 | 6/1983 | Abrams et al. ............... 423/242 |
| 4,604,269 | 8/1986 | Yoon ............................. 423/242 |
| 4,956,162 | 9/1990 | Smith et al. .................. 423/244 |

Primary Examiner—Gregory A. Heller
Attorney, Agent, or Firm—Needle & Rosenberg

[57] ABSTRACT

Apparatus and process to achieve improved performance with a dry scrubbing flue gas desulfurization (FGD) system. The process consists of injecting sorbent slurry into flue gas from fossil fuel combustion, cooling the flue gas containing the injected slurry and collecting the slurry solids, reaction products, and fly ash in a filter. The apparatus comprises means for cooling the flue gas between the slurry injecting means and the filter.

8 Claims, 3 Drawing Sheets

DRY SORBENT REACTIVATION PROCESS

BACKGROUND OF THE INVENTION

This invention pertains to methods for removal of pollution from the exhaust gas stream of combustion sources. More particularly, the invention relates to an improved method of elimination of sulfur oxides and volatile toxic materials from the flue gas of coal fired boilers, especially in large electric generating plants.

Because of increasing public concern over deterioration of the environment, industries are being required by current and anticipated regulations to limit the emission of toxic materials (e.g. volatile metals or organic materials), and precursors to acid rain (sulfur oxides and nitrogen oxides) into the atmosphere. Unfortunately, many processes for controlling these pollutants are either unproven or expensive. Known sulfur oxides ($SO_2$ and $SO_3$) removal and collecting processes include wet scrubbers, dry scrubbers and dry powder injection. Modern particulate collection means include fabric filters (baghouses) and electrostatic precipitators. Methods of collecting volatile toxic materials are not well established, but are generally based on scrubber or fabric filter technology.

An electrostatic precipitator (ESP) consists of a series of pairs of electrodes maintained at a high voltage difference within a gas passage for ionizing the air. As dust or ash laden air passes between the electrodes, the particles are also ionized and move in the electrical fields to be collected on one of the electrodes. The material that is collected is periodically dumped into hoppers by mechanical means and removed to a disposal site. ESPs have been selected as the particulate removal means in the past due to their low cost. However, with more stringent removal requirements, alternate technologies have become competitive, since ESPs are extremely sensitive to dust properties (i.e., coal types).

Baghouses comprise an array of tubular fabric filters within a large filter casing through which flue gas containing dust or ash is drawn by a large fan. The fabric filters are cleaned periodically by pulse jet, reverse-gas flow or shaking. Pulse jet cleaned fabric filters can have a higher air to cloth ratio (3:1) than reverse-gas cleaned filters (2:1), therefore providing a size advantage over other fabric filter designs. The particles are collected in hoppers for disposal. Baghouses are relatively insensitive to the properties of the particulates and have a very high collection efficiency.

Dry scrubbing is a developing form of flue gas desulfurization (FGD) technology which utilizes a slurry, comprising sorbent material and water, to adsorb sulfur oxides and permit their removal from flue gas. Furthermore, in dry scrubbing processes, sorbent material is mixed with flue gas by being injected into plant flue gases between the combustion source and the particulate collection device. The sorbent is usually calcium based, such as calcium hydroxide (slaked lime), or hydrated dolomitic lime ($CaMg(OH)_4$ or $CaMgO(OH)_2$), although sodium-based sorbents (Nahcolite, or Trona) have also been used. Dry scrubbing systems inject calcium hydroxide or other sorbent into the duct as a slurry containing sorbent and water. In such cases evaporation of the water in the slurry cools and humidifies the flue gas contained in the duct. A dry scrubber uses a slurry of sorbent with only enough water to approach temperatures within, typically, 20° F. above the adiabatic saturation temperature. Another characteristic of dry scrubbing is that the heat of the flue gas at the point of slurry injection is sufficient to evaporate all or nearly all of the water in the slurry to form a particulate of the sorbent and adsorbed sulfur oxides, and the products of the process are removed from the system as a dry powder in contrast to a liquid slurry, which is the form of the product recovered from a wet scrubber.

An example of a dry powder injection system is the HyPas test system, disclosed in U.S. Pat. No. 4,956,162, in which water is injected into the flue gas before injection of the dry sorbent powder (calcium hydroxide). There are two disadvantages to this type of process: (1) limited sorbent utilization and sulfur oxides removal occurs under most conditions, probably because a sulfite shell immediately begins to form around the solid calcium hydroxide crystals, thus imposing a diffusion barrier to sulfur oxides; and (2) corrosive gases (HCl and $H_2SO_4$) are formed upon injection of water into the duct prior to the addition of sorbents which adsorb the corrosive gases. In general, dry powder injection systems are not as effective as dry scrubbing (slurry injection) processes at adsorbing either sulfur oxides or sulfuric acid that will be present in flue gas produced by combustion of high sulfur coals. The comparative ineffectiveness of dry powder injection is exemplified by the HyPas process shown in Table 1.

The most prevalent dry scrubbing slurry injection system is the rotary atomizer spray dryer, which injects a slurry comprising calcium hydroxide and water (25–40% solids). The atomizer produces a spray of small droplets (50–100 $\mu$m) that contact the flue gas in a spray drying vessel with cyclonic gas flow. Evaporation of the water in the slurry droplets cools and humidifies the flue gas and leaves hydrated lime particles to react with the sulfur oxides in the flue gas. Typical residence time in spray drying vessels is 10 to 12 seconds. Spray dryers have been demonstrated to remove greater than 90% of the sulfur dioxide ($SO_2$) from the flue gases from the combustion of high-sulfur coal. Dry fly ash, calcium sulfite and sulfate, and unreacted calcium hydroxide are passed from the spray drying vessel through a duct into a particulate control device.

Duct injection, in contrast to spray drying, involves direct injection of sorbent into the duct without the large reaction vessel used in spray dryers. Duct injection, as implemented in the prior art, typically removes 20% to 60% of the sulfur oxides from coal combustion flue gases. Low rates of sorbent utilization are therefore typical of existing duct injection systems. The relatively low sulfur oxides removal efficiency and low sorbent utilization efficiency of existing duct injection systems result from both the lack of residence time for adsorption reactions in a typical duct and the inability to operate at temperatures close to adiabatic saturation temperatures because of wall deposition problems.

There are many pilot and full-scale flue gas desulfurization (FGD) systems producing dry reaction products. The results of tests of some full-scale dry FGD systems are listed in Table 1. Some are dry scrubbers while others like HyPas use dry powder injection. Some of these systems use ESPs to remove sulfur oxides, while others use fabric filters (baghouses). It is noteworthy that fabric filters in these systems remove as much as 89% of the $SO_2$ entering them. Data from the EPRI High Sulfur Test Center not included in Table 1 indicate that even higher removals of $SO_2$ can be achieved across a fabric filter. Two cases that provide good comparisons between the contributions of fabric filters and ESPs to $SO_2$ removal efficiency are included in Table 1. The Laramie River and Craig plants have similar Babcock & Wilcox (B&W) dry scrubbers of the spray dryer type. The ESP is credited with no removal of $SO_2$ at Laramie River, whereas the fabric filter at Craig, even though operated at a temperature 50° F. above the adiabatic saturation temperature, removes 30% of the $SO_2$ entering it. As a second example, data from tests at TVA's Shawnee plant directly compare the $SO_2$ removals across an ESP and a fabric filter in a high-sulfur coal application of spray dryer technology. As shown in Table 1, the fabric filter $SO_2$ removal at Shawnee is 36% to 46x% higher than the removal in the ESP. The relative effectiveness of fabric filters in overall $SO_2$ removal is a major reason fabric filters are the predominant particulate control device on dry FGD systems.

Of the full-scale dry scrubbing FGD systems in service, the B&W dry scrubber is the system that most resembles the duct injection process. The B&W scrubber consists of a spray drying chamber into which an array of dual-fluid nozzles (B&W I-Jet design) spray a slurry comprising calcium hydroxide and water. This system, which is installed at Craig Station in Colorado, has a 9-second residence time in a spray drying chamber. With a temperature of 18° F. above the adiabatic saturation temperature at the exit of the spray drying chamber, and a calcium to sulfur ratio of 1.4 to 1, the scrubber removes about 78% of the $SO_2$ from the flue gas. The gas is then reheated to 50° F. above the adiabatic saturation temperature at the inlet to the baghouse. The fabric filter removes 30% of the $SO_2$ entering it, boosting the system $SO_2$ removal efficiency to 85%.

Currently, dry FGD systems located upstream of fabric filters are operated to avoid any condensation in the fabric filter. A reheating step is sometimes used to allow the scrubber to operate at lower flue gas temperatures for increased $SO_2$ removal efficiency while protecting the downstream fabric filter from the corrosion and irreversible clogging associated with temperatures that approach the adiabatic saturation temperature of the flue gas. These potential problems have played a role in the design of current FGD and fabric filter systems. Corrosion problems have been reported in numerous installations. However, there is evidence of fabric filter temperature excursions below the adiabatic saturation temperature that did not clog or otherwise irreversibly damage the filter bags. In general, the dustcake, comprising fly ash, reacted sorbent and unreacted sorbent, formed in fabric filters downstream of dry FGD systems, is easier to clean from the filters than a dustcake of fly ash alone.

Data in Table 1 suggest that dry scrubbing FGD systems can achieve high sulfur oxides removal efficiency, and illustrate the dependence of sulfur oxides removal efficiency in dry scrubbing systems on the stoichiometric ratio of calcium to sulfur and flue gas relative humidity. Optimizing the utilization of sorbent in dry scrubbing systems requires operating at temperatures close to the adiabatic saturation temperature of the flue gas. This requirement is especially critical in duct-injection processes, where the residence time for reaction of the sorbent and sulfur oxides is necessarily shorter than the 10 to 12 seconds available in typical dry scrubbers that use large reaction vessels.

The poor utilization of sorbent in duct-injection systems operated at conventional temperatures of greater than 20° F. above the saturation temperature, makes the levelized costs of these systems relatively high in spite of their substantial advantage in capital cost. Duct injection has been characterized as the process with the least capital cost of any FGD system, but among the highest operating costs in terms of dollars per ton of $SO_2$ removed from the flue gas. For this reason, duct injection has been aimed primarily at installations that require the retrofit of an FGD system into a very constrained physical space, or that have limited life expectancy which dictates a minimum capital expense for any upgrade.

As a result of the capital cost advantages and poor sorbent utilization and removal efficiencies (high operating costs) which are associated with conventional duct injection technology, there exists a need for a dry scrubbing process that can increase the sorbent utilization and removal efficiencies.

SUMMARY OF THE INVENTION

The process and apparatus of this invention provide improved desulfurization and sorbent utilization in dry scrubbing flue gas desulfurization systems by the addition of a cooling step between slurry injection and particulate collection that is not known in the prior art. The process includes injecting a slurry containing a sorbent and water into the flue gas to form slurry solids. After most of the water in the slurry has evaporated and the concomitant cooling due to evaporation of water in the slurry has occurred, the flue gas is further cooled to between about 0° F. and about 45° F. above the adiabatic saturation temperature of the flue gas. After cooling, the flue gas is filtered with a fabric filter.

The apparatus of the improved dry scrubbing flue gas desulfurization process comprises a duct for removing the flue gas stream from a combustion source to a baghouse comprising a fabric filter, means for injecting a slurry into the duct, means for cooling the flue gas stream, which means is located between the slurry injecting means and the baghouse.

It is an object of the present invention to provide improved sorbent utilization in a dry scrubbing desulfurization process. It is a further object to provide improved sulfur oxides removal in a dry scrubbing desulfurization process. A still further object of this invention is to avoid duct deposition, fabric filter clogging and fabric filter corrosion while improving sorbent utilization and sulfur oxides removal. It is a further object to provide improved toxic substance removal from flue gas.

DETAILED DESCRIPTION OF THE PREFERRED EMBODIMENT

Figure 1A:
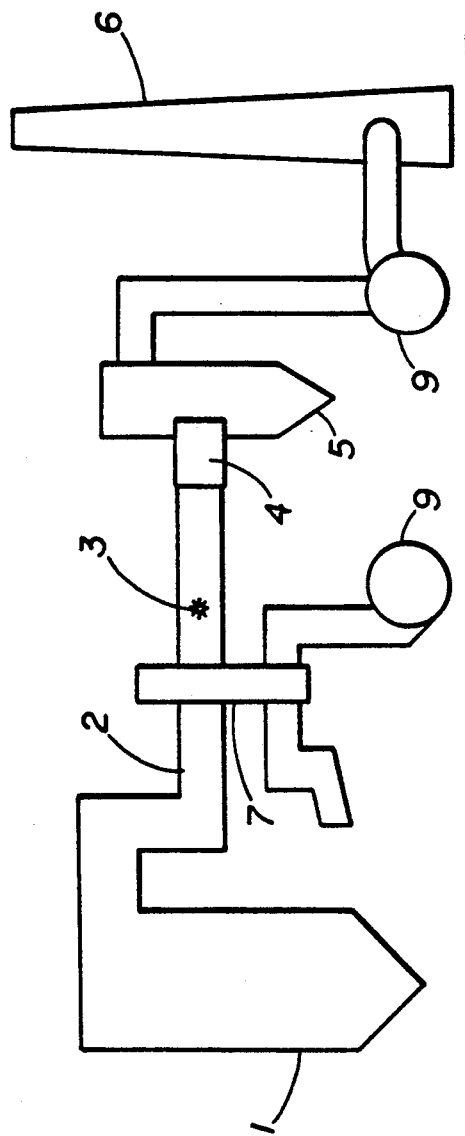
FIG. 1a is a schematic diagram of a first embodiment of the dry sorbent reactivation process.
Figure 1B:
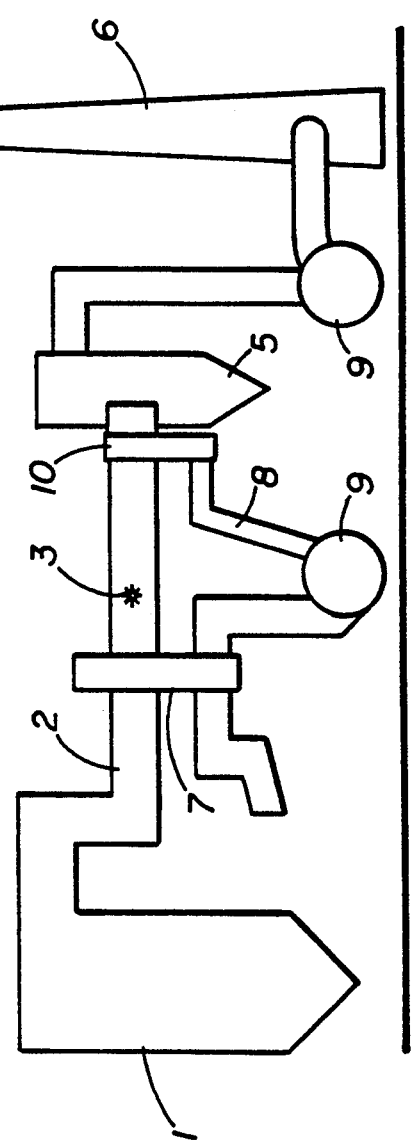
FIG. 1b is a schematic diagram of a second embodiment of the dry sorbent reactivation process.

FIG. 1a and FIG. 1b show the relationship of the elements of two embodiments of the dry sorbent reactivation process and apparatus. Depicted in FIGS. 1a and 1b are a combustion source 1, ducts 2, slurry injecting means 3, liquid spraying means 4, baghouses 5, exhaust stacks 6, air preheaters 7, an air preheat duct 8, fans 9 and a heat exchanger 10. The combustion source 1 can be a boiler or a fossil-fuel-fired combustor that produces a flue gas stream. Ducts 2 are means for conveying the flue gas stream from the combustion source 1 to the particulate collection means, which can be a baghouse 5 or an ESP.

This invention provides a dry scrubbing flue gas desulfurization process that includes injecting a slurry containing a sorbent and water into the flue gas to form a particulate of slurry solids, wherein the slurry comprises effective amounts of a sorbent and liquid. The flue gas is next cooled to between about 0° F. and about 45° F. above the adiabatic saturation temperature of the flue gas. After cooling, the flue gas is passed through a fabric filter. The cooling step of this invention can be accomplished by passing the flue gas through a heat exchanger 7. Alternatively, the flue gas can be cooled by spraying water or other suitable liquid into the flue gas. The preferred temperature to which the flue gas is cooled is a range from about 10° F. to about 25° F. above the adiabatic saturation temperature of the flue gas, although satisfactory results have been obtained using the broader range of temperatures recited above. The adiabatic saturation temperature of the flue gas is defined herein as the temperature to which the flue gas can be cooled by the injection and total adiabatic evaporation of water, such that no water remains in the liquid phase, and such that the gas phase is completely saturated with water vapor upon completion of the evaporation process. The parameters for determining the adiabatic saturation temperature of the flue gas include the initial temperature of the flue gas and the initial water content of the flue gas.

In the process of the present invention the preferred slurry comprises the sorbent calcium hydroxide and water, but other sorbents such as hydrated dolomitic lime can be used. It is also contemplated that the slurry can further comprise fly ash recycled from the particulate collection means. The process can use a stoichiometric ratio of sorbent to sulfur of in the range of about 1.5 to 1 to about 2.2 to 1. It is further contemplated that a range of sorbent to sulfur ratios of about 0.5 to 1 to about 3.0 to 1 will also be effective for desulfurization. The desulfurization process described herein includes maintaining the temperature of the fabric filter in a range near the temperature of the cooled flue gas. This can be accomplished as a result of cooling the gas itself or it can be accomplished by a separate temperature controlling step for the baghouse 5 or for the ESP in an alternative embodiment. The heat of reaction liberated, when the partially utilized sorbent from the slurry injection means reacts with $SO_2$ in the baghouse or ESP, acts to prevent condensation within the particulate control device even though the cooling process has decreased the overall gas temperature to values close to the condensation point.

Finally, an improved dry scrubbing flue gas desulfurization apparatus is provided. The apparatus includes a particulate collection means which can be a baghouse 5 comprising a fabric filter in the preferred embodiment or, alternatively, it can be an ESP. The apparatus further comprises a duct 2 for conveying the flue gas stream from a combustion source 1, means for injecting a slurry 3 into the flue gas stream intermediate the combustion source 1 and the particulate collection means, and means for cooling the flue gas stream, which means is located between the slurry injecting means 3 and the baghouse 5 or other particulate collection means after the water in the slurry has evaporated. The slurry injecting means 3 comprises a duct injector in the preferred embodiment; alternatively, it can be a spray dryer. The cooling means can comprise a means for spraying liquid 4 into the flue gas, the preferred liquid being water. In the alternative, the cooling means can be a heat exchanger 10, with partial recovery of the heat removed from the flue gas by means of the air preheat duct 8.

In the preferred embodiment, the cooling means of the apparatus is located upstream from and adjacent to the particulate collection means. In the embodiment using a baghouse, the cooling means can be located within the baghouse 5. The slurry injecting means 3 of this apparatus can be a spray dryer or a duct injector. The preferred particulate collection means is a baghouse 5. Alternatively, the particulate collection means can be an electrostatic precipitator.

The process of this invention is called dry sorbent reactivation (DSR) because a secondary cooling step reactivates the dry sorbent through increased adsorption of water by the sorbent particles as the adiabatic saturation temperature is approached, thus increasing calcium utilization in the fabric filter without compromising the operational reliability of the sorbent injection system or the fabric filter. The removal of sulfur oxides is accomplished by treating sorbent delivery and sorbent collection as two integrated components of the overall flue gas treatment system. This process optimizes both of the components to achieve the highest efficiency of removal of sulfur oxides. The slurry injection system parameters can be optimized to obtain the maximum possible reliability through operation at higher approach temperatures which would otherwise produce unacceptably low values of sulfur oxides removal and calcium utilization.

The dry scrubbing process includes the use of spray nozzles or a rotary atomizer to inject a slurry comprising calcium hydroxide (sorbent) and water into the flue gas downstream of a boiler or fossil-fuel-fired combustion source 1 where the flue gas temperature has been cooled with a conventional air preheater 7 to the range of 450° to 200° F. Alternatively, hydrated dolomitic lime or other suitable calcium-based mineral can be used as the sorbent in the slurry. The slurry injection rate is controlled by feedback control to maintain a stoichiometric ratio of calcium to sulfur in an effective range, including the range of from 0.5 to 1 to 3.0 to 1, with preferred operation in the range of from 1.0 to 1 to 2.2 to 1.

The temperature of the flue gas downstream of the slurry injection point is determined by the initial temperature of the flue gas, the injection rate of the slurry, and the water content of the slurry. The slurry may contain sufficient water to cool the gas to within 45° F. to 25° F. of the adiabatic saturation temperature upon injection, while the cooling step lowers and controls the temperature of the mostly dry slurry particulate in the flue gas and on the fabric filter in the baghouse 5 to the preferred range from about 10° F. to 25° F. above the adiabatic saturation temperature. Alternatively, the range of from 0° F. to 45° F. above the adiabatic saturation temperature can also yield satisfactory results. The cooling step of this process is performed after most or all of the water in the slurry has evaporated but before the flue gas contacts the fabric filter. Slurry solids are the particulates that form after most or all of the water has evaporated from the slurry. The temperature of the flue gas entering the baghouse 5 can be controlled by feedback from a combination of temperature, flue gas flow rate, water concentration, and sulfur dioxide concentration monitor. The temperature of the baghouse itself will generally be within a range near the temperature of the cooled flue gas.

A significant aspect of the process is that it is not necessary to dilute the slurry with enough water to cool the flue gas to within 20° F. or less of the adiabatic saturation temperature in order to achieve high $SO_2$ removals. Problems with moist deposits have been reported to occur at close approaches to the adiabatic saturation temperature in both duct injection systems and conventional spray dryer systems when these close approach temperatures are obtained by evaporation of water in the injected slurry. The cooling step after slurry injection allows the solids content of the slurry to be maintained at values that are sufficiently high to avoid the problem of moist deposits in the ducts.

The DSR process can also serve as a control technology for certain types of toxic substances in flue gases. Lowering the temperature of the flue gas before it contacts the fabric filter will result in an increase in the degree of condensation of some of the toxic substances that are in flue gases or will enhance adsorption of vapors on filtered slurry solids. The use of the cooling step and the fabric filter will result in significantly decreased fine particle and toxic substance emission rates compared with emission rates for conventional wet scrubbing desulfurization systems.

EXAMPLES

The following examples illustrate an embodiment of the process and should not be construed as limiting.

A small, portable sampling system that simulates fabric filter operation (SSFF) was installed at the U.S. Department of Energy's Duct Injection Test Facility (DITF) at the Muskingum River Plant in Beverly, Ohio. The SSFF was configured to simulate pulse-jet filtration of a 3 cfm (cubic feet per minute) slipstream of flue gas taken from the DITF duct downstream of the sorbent slurry injection point. In these tests the fabric used was a felted fabric typical of those used in pulse jet baghouses. Tests were performed to evaluate the dry sorbent reactivation process by cooling the flue gas to temperatures closer to the adiabatic saturation temperature of the flue gas than can be effectively accomplished with evaporation of water in the injected slurry alone. The results indicate that the cooling step following the slurry injection step substantially increased the utilization of calcium, and concomitantly increased the amount of sulfur oxides removed from the flue gas with a given amount of calcium hydroxide in the slurry injected into the duct containing the flue gas.

The tests revealed that at similar flue gas humidities, the incremental $SO_2$ removal achieved by the SSFF was equivalent to results reported in Table 1 from tests with spray dryers at the TVA pilot-scale system in Shawnee and at the EPRI High Sulfur Test Center. The dry sorbent reactivation process, however, was able to achieve $SO_2$ removals in excess of 90% at a calcium to sulfur ratio of 2 to 1 with a residence time in the duct of only 1.5 seconds followed by cooling to 10° F. above adiabatic saturation temperature. This is an improvement over conventional spray drying systems, which required a vessel with a residence time of greater than 10 seconds and recycling of solids to achieve the same removal levels. The cooling step of the dry sorbent reactivation process also allows the sorbent injection equipment (either duct injection or conventional spray dryer) to operate at approach temperatures higher than 20° F. above adiabatic saturation temperature while the integrated system is achieving a 90+% $SO_2$ removals at a calcium to sulfur ratio of 2 to 1. Results obtained with dry sorbent reactivation are superior to any previously reported results using duct injection technology.

Results of the SSFF tests using the dry sorbent reactivation process of this invention are presented in Table 2. In these tests, the step of cooling the flue gas after sorbent slurry injection step was performed by means of a single pipe heat exchanger. The amount of cooling obtained was varied by adjusting the voltage applied to electrical heat tracing which surrounded an insulated pipe transporting the flue gas and sorbent from the duct to the SSFF filtration cabinet. Maximum cooling was obtained with no energization of the heat tracing, thus allowing the exterior of the pipe to reach ambient temperature. The temperature of the fabric filter was maintained independent of the cooling step with heaters in the filter casing so that the temperature of the filter did not drop below the temperature of the flue gas and slurry solids entering the filtration cabinet. In the preferred embodiment, the temperature of the baghouse (fabric filter) will be controlled by the cooling step.

The dustcake on the filter provides for intimate contact between the flue gas and unspent sorbent. This results in a rise in $SO_2$ removal as the dustcake accumulates on the fabric. The sharp reduction in pressure drop to a value nearly equivalent to the pressure drop across a clean fabric is evidence that the dustcake is very easily removed from the fabric with a pulse jet of reverse air. There were no measurable particulate emissions from these short-term tests. The sorbent used in these tests was calcium hydroxide and the sorbent to sulfur ratio ranged from 1 to 1 to 2 to 1. It is contemplated that a higher ratio of sorbent to sulfur would also be effective.

Example 1

Figure 2:
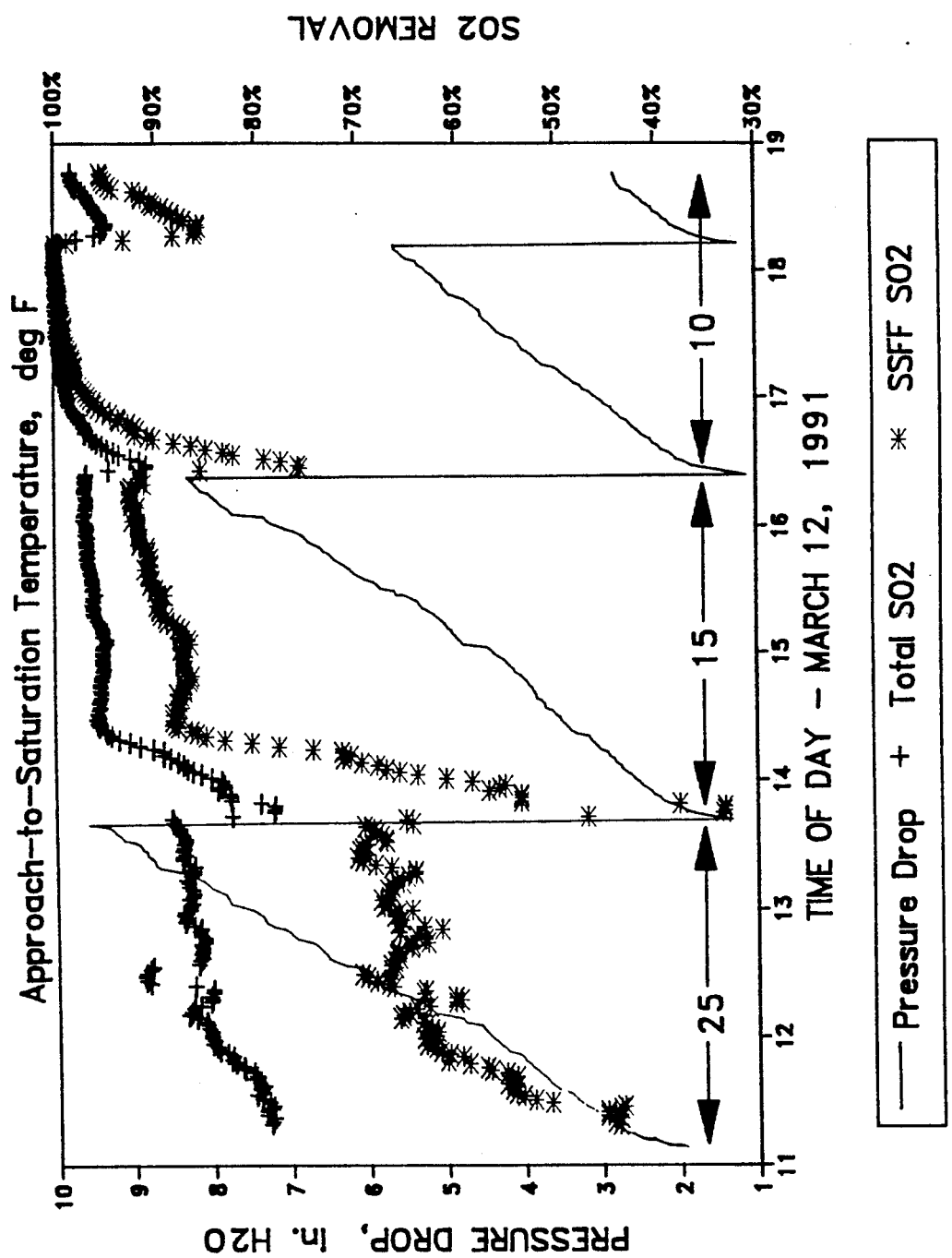
FIG. 2 is a graph of the pressure drop and sulfur dioxide removal as a function of time and closeness to adiabatic saturation temperature in one series of tests of the dry sorbent reactivation process.

FIG. 2 shows results from one series of tests in which the temperature in the DITF duct was 45° F. above the adiabatic saturation temperature after the slurry injection step and before the cooling step. In this example the fabric filter and the temperature of the flue gas after the cooling step were controlled to 25° F., 15° F., and then 10° F. above the adiabatic saturation temperature through one cycle for each temperature. The sorbent was calcium hydroxide and the sorbent to sulfur ratio in this example was 1.8 to 1. The efficiency of the SSFF as a reactor for removing $SO_2$ increased dramatically as the temperature of the flue gas at the SSFF approached the adiabatic saturation temperature.

Example 2

Figure 3:
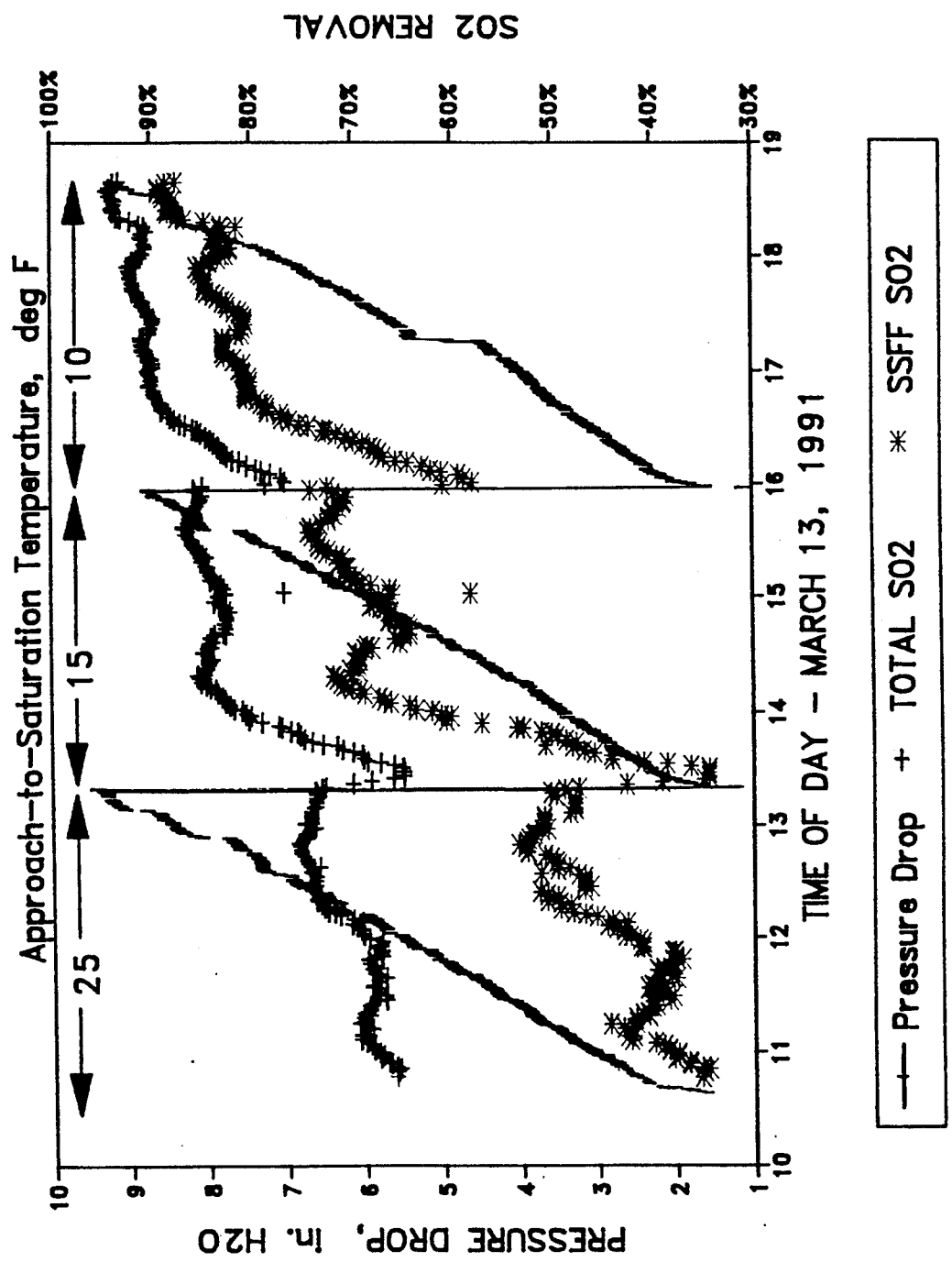
FIG. 3 is a graph of the pressure drop and sulfur dioxide removal as a function of time and closeness to adiabatic saturation temperature in a second series of tests of the dry sorbent reactivation process.

FIG. 3 shows results from another series of tests in which the flue gas in the DITF duct after the slurry injection step and before the cooling step was 25° F. above the adiabatic saturation temperature. In this example the temperature of the flue gas and the SSFF were again controlled to 25° F., 15° F. and then 10° F. above the adiabatic saturation temperature through one filtration cycle for each temperature. The sorbent was calcium hydroxide and the sorbent to sulfur ratio was 2 to 1. At 10° F. above adiabatic saturation temperature the SSFF removed greater than 99% of the SO₂.

Modifications and variations of the present invention will be obvious to those skilled in the art from the foregoing detailed description of the invention. Such modifications and variations are intended to come within the scope of the appended claims.

TABLE 1
EXAMPLES OF DRY FGD PROCESSES

| PLANT | FGD SYSTEM | Collector | Ca/S | $\Delta T_a$ (°F.) Scrubber | $\Delta T_a$ (°F.) Collector | SO₂ REMOVAL (%) Scrubber | SO₂ REMOVAL (%) Collector | SO₂ REMOVAL (%) TOTAL |
|---|---|---|---|---|---|---|---|---|
| Laramie Riv. | B & W Dry Scrubber | ESP | 1.0 | 25 | 25 | 85 | 0 | 85 |
| Craig | B & W Dry Scrubber | FF | 1.0 | 25 | 50 | 60 | 30 | 72 |
| Craig | B & W Dry Scrubber | FF | 1.4 | 18 | 50 | 78.5 | 30 | 85 |
| Springerville | Joy/Niro SDA | FF | 0.87 | 30 | ~48 | | | 60.2 |
| Springerville | Joy/Niro SDA | FF | 1.61 | 30 | ~48 | | | 85.5 |
| Antelope Val. | Joy/Niro SDA | FF | 0.5 | 18 | ~18 | | | 81 |
| Antelope Val. | Joy/Niro SDA | FF | 0.47 | 33 | 33 | | | 63.9 |
| Riverside | Joy/Niro SDA | FF | 0.71 | 20 | ~20 | | | 74.3 |
| Riverside | Joy/Niro SDA | FF | 1.33 | 18 | ~18 | | | 88.1 |
| Holcomb | Joy/Niro SDA | FF | 0.89 | 51.6 | 51.6 | | | 81 |
| Sherburne | Joy/Niro SDA | FF | | 18 | ~18 | | | |
| Valmy | CE Spray Dryer | FF | ~0.5 | 25 | 40 | | | 74 |
| Shawnee | RC pilot spray dryer | FF | 0.7–1.6 | 15 | 15 | 60–72 | 35–70 | 68–95 |
| Shawnee | RC pilot spray dryer | ESP | 1.0–1.6 | 18 | 18 | 60–70 | 19–45 | 70–83 |
| Stanton | RC dry FGD system | FF | | | | | | 80.6 |
| HSTC | SD-PJFF | FF | 1.6 | 20 | 20 | 82 | 89 | 98 |
| HSTC | SD-PJFF | FF | 1.3 | 20 | 20 | 73 | 48 | 86 |
| HSTC | HyPAS | FF | 2.0 | 20 | 20 | | | 42 |

KEY TO ABBREVIATIONS
$\Delta T_a$ = approach-to-saturation temperature
Ca/S = calcium-to-sulfur stoichiometric ratio
Collector = particulate control device
FF = fabric filter
ESP = electrostatic precipitator
B & W = Babcock & Wilcox
CE = Combustion Engineering
HSTC = EPRI High Sulfur Test Center
RC = Research-Cottrell
SDA = spray dryer absorber
SD-PJFF = spray dryer and pulse-jet fabric filter

TABLE 2
RESULTS OF SSFF TESTS

| SO₂ at Inlet (ppm) | Ca/S Ratio (approx.) | DITF $\Delta T_a$ (°F.) | $\Delta$SO₂, % ESP Inlet | $\Delta$SO₂, % ESP Outlet | SSFF $\Delta T_a$ (°F.) | $\Delta$SO₂, % After Clean | $\Delta$SO₂, % Before Clean |
|---|---|---|---|---|---|---|---|
| 1300 | 2.0 | 45 | 46 | 60 | 45 | 58 | 60 |
| 1300 | 2.0 | 45 | 46 | 60 | 25 | 58 | 68 |
| 1300 | 2.0 | 25 | 62 | 75 | 25 | 70 | 80 |
| 2000 | 2.0 | 45 | 52 | 62 | 45 | 62 | 67 |
| 2000 | 2.0 | 45 | 52 | 62 | 25 | 60 | 75 |
| 2000 | 2.0 | 25 | 59 | 79 | 30 | 75 | 85 |
| 2000 | 2.0 | 25 | 59 | 79 | 25 | 75 | 92 |
| 2000 | 2.0 | 25 | 60 | 79 | 25 | 78 | 87 |
| 2000 | 2.0 | 25 | 60 | 79 | 15 | 78 | 97 |
| 2000 | 2.0 | 25 | 60 | 79 | 10 | 90 | >99 |
| 2000 | 1.8 | 45 | 46 | 59 | 25 | 68 | 75 |
| 2000 | 1.8 | 45 | 46 | 59 | 15 | 65 | 75 |
| 2000 | 1.8 | 45 | 46 | 59 | 10 | 77 | 93 |
| 2000 | 1.0 | 25 | 44 | 56 | 25 | 53 | 61 |
| 2000 | 1.0 | 25 | 44 | 56 | 15 | 56 | 65 |

What is claimed is:

1. A dry scrubbing flue gas desulfurization process, wherein the flue gas comprises sulfur oxides, comprising the steps of:
   (a) injecting a slurry into the flue gas to form particles of slurry solids wherein the slurry comprises effective amounts of water and a calcium-based sorbent in a stoichiometric ratio of sorbent to sulfur of from about 0.5 to 1.0 to about 3.0 to 1.0, wherein the injection of the slurry causes evaporative cooling of the flue gas;
   (b) cooling the flue gas to between about 0° F. and about 45° F. above the adiabatic saturation temperature of the flue gas in a secondary cooling step after most of the water in the injected slurry has evaporated;
   (c) passing the flue gas through a filter; and
   (d) discharging the flue gas to the atmosphere.

2. The process of claim 1, wherein the cooling step comprises spraying liquid into the flue gas.

3. The process of claim 1, wherein the cooling step comprises passing the flue gas through a heat exchanger.

4. The process of claim 1, wherein the sorbent is calcium hydroxide.

5. The process of claim 1, wherein the sorbent is hydrated dolomitic lime.

6. The process of claim 1, wherein the flue gas comprises sulfur oxides, and wherein the stoichiometric ratio of sorbent to sulfur is from about 1.5 to 1 to about 2.2 to 1.

7. The process of claim 1, wherein the flue gas is cooled to between about 10° F. and about 25° F. above the adiabatic saturation temperature of the flue gas.

8. The process of claim 1, further comprising the step of maintaining the temperature of the filter in a range near the temperature of the cooled flue gas.

* * * * *